US008052093B2

(12) United States Patent
Faucheux et al.

(10) Patent No.: US 8,052,093 B2
(45) Date of Patent: Nov. 8, 2011

(54) CONTROL MOMENT GYRO AND DEVICE FOR ASSEMBLY THEREOF

(75) Inventors: Philippe Faucheux, Gagnac sur Garonne (FR); Stéphane Chupin, Auzeville-Tolosane (FR)

(73) Assignee: Astrium SAS, Paris (FR)

( * ) Notice: Subject to any disclaimer, the term of this patent is extended or adjusted under 35 U.S.C. 154(b) by 268 days.

(21) Appl. No.: 12/446,721

(22) PCT Filed: Oct. 3, 2007

(86) PCT No.: PCT/FR2007/052066
§ 371 (c)(1),
(2), (4) Date: Apr. 22, 2009

(87) PCT Pub. No.: WO2008/050019
PCT Pub. Date: May 2, 2008

(65) Prior Publication Data
US 2010/0006705 A1   Jan. 14, 2010

(30) Foreign Application Priority Data

Oct. 23, 2006  (FR) ..................................... 06 09278

(51) Int. Cl.
*B64G 1/28* (2006.01)
(52) U.S. Cl. .......................................... 244/165; 74/5.7
(58) Field of Classification Search ............... 244/158.1, 244/164, 165; 74/5.5, 5.7, 5.8, 5.9, 5 R
See application file for complete search history.

(56) References Cited

U.S. PATENT DOCUMENTS

| 3,340,739 | A | * | 9/1967 | Colton, Jr. et al. ............... 74/5.5 |
| 3,446,080 | A | * | 5/1969 | Amsler et al. .................. 74/5 R |
| 3,452,948 | A |   | 7/1969 | Kukel et al. |
| 4,275,861 | A | * | 6/1981 | Hubert ............................ 244/165 |
| 5,112,012 | A | * | 5/1992 | Yuan et al. ...................... 244/165 |
| 5,368,271 | A | * | 11/1994 | Kiunke et al. ................. 248/638 |
| 5,820,078 | A | * | 10/1998 | Harrell ............................ 244/165 |
| 5,820,079 | A |   | 10/1998 | Harrell |
| 6,135,392 | A |   | 10/2000 | Wakugawa |
| 6,305,647 | B1 |   | 10/2001 | Defendini et al. |
| 7,171,290 | B2 |   | 1/2007 | Lagadec et al. |
| 2005/0109135 | A1 | * | 5/2005 | Defendini et al. ............. 74/5 R |

FOREIGN PATENT DOCUMENTS

| EP | 0 848 186 A | 6/1998 |
| FR | 2 786 283 A1 | 11/1998 |
| FR | 2 826 470 A1 | 6/2001 |
| WO | WO 02/10015 A | 2/2002 |
| WO | WO 03/080439 A | 10/2003 |

OTHER PUBLICATIONS

International Search Report for related international application No. PCT/FR2007/052066, report dated May 13, 2008.

* cited by examiner

*Primary Examiner* — Timothy D Collins
*Assistant Examiner* — Jamie S Stehle
(74) *Attorney, Agent, or Firm* — Miller, Matthias & Hull, LLP

(57) ABSTRACT

The gyrodyne includes an inertial wheel mounted, via a wheel support, on the moving part or rotor of a cardan assembly. The cardan assembly is provided with a stator and the rotor is rotatable with respect to the stator about a first axis of rotation, it being possible for the spinner of the inertial wheel to be set in rotation about a second axis of rotation not aligned with the first axis of rotation. The stator of the cardan is mounted on a block and fixed to this block via an arrangement of vibration attenuators or insulators. The mechanism for setting the rotor in rotation is at least partially housed in the interior volume of the block.

18 Claims, 5 Drawing Sheets

CONTROL MOMENT GYRO AND DEVICE FOR ASSEMBLY THEREOF

CROSS-REFERENCE TO RELATED APPLICATIONS

This application is a U.S. national stage filing of International Patent Application No. PCT/FR2007/052066 filed on Oct. 3, 2007, which claims priority under the Paris Convention to French Patent Application No. 06 09278, filed on Oct. 23, 2006.

The present invention relates to a gyroscopic-effect torque actuator, also called a control moment gyro, and its device for mounting on a carrying structure.

FIELD OF THE DISCLOSURE

Background of the Disclosure

The subject is control moment gyros made of an inertia wheel (also called a momentum wheel) mounted on a device for placing in rotation on an axis, a device sometimes called a "gimbal" even though there is only one axis of rotation. The inertia wheel comprises a spinner which is rotated and kept at a substantially constant speed by appropriate means, so as to create an angular momentum with a substantially constant norm. The wheel is rigidly attached to the movable portion (the rotor) of the gimbal by a structural part that will be called the "wheel support". The fixed portion of the gimbal (commonly called the stator) is designed to be attached to a carrying structure. The rotor is placed in rotation relative to the stator of the gimbal by appropriate means (bearings, motor, etc.), so that the rotor rotates about a fixed axis, called the gimbal axis, relative to the stator. The arrangement of the wheel, the wheel support and the gimbal assembly is such that the angle between the gimbal axis and the angular momentum of the wheel is constant, always not zero, and in most cases equal to 90°. The rotation of the rotor of the gimbal makes it possible to make the angular momentum of the wheel pivot, thereby creating a gyroscopic torque on the carrying structure equal to the vectorial product of the instantaneous speed vector of rotation of the rotor of the gimbal and of the angular momentum vector of the wheel.

The electrical supply of the sensors and motors necessary for the control moment gyro to operate, and the controls for the orientation of the gimbal axis, and of the speed of the spinner, are carried out with the aid of control electronics which, according to the prior art, are partially or totally remote and not incorporated in their totality in the mechanical portion of the control moment gyro. The electronics and the electric elements of the control moment gyro are then connected with the aid of electric cables that may measure up to a few meters in length. On the other hand, because of the intense radiation suffusing the environment in which the satellite usually operates, these electronics must be protected by cases that are most frequently made of aluminum, the thickness of which must be sufficient to attenuate the harmful effects of said radiation.

Furthermore, another element to be taken into account is the fact that the momentum wheel is not ideally balanced. In operation, the control moment gyro will create undesirable microvibrations which will be transmitted via the carrying structure to possibly sensitive elements of payloads, such as for example optical detectors, and will disrupt their operation.

Control moment gyros find a major application in systems for controlling attitude and orientation, in particular in satellite steering systems. Specifically, it is an item of equipment making it possible to deliver considerable necessary torques, notably to the rapid tilting of the line of sight of instruments on board satellites.

Usually, use is made of a control moment gyro cluster comprising at least three control moment gyros to make it possible to reorient a three-dimensional axis system of reference linked to the satellite in all the attitudes and, in certain other cases, a control moment gyro cluster comprising at least two control moment gyros for tilting on two axes. Most frequently, at least four control moment gyros are used in a cluster in order to provide redundancy and to simplify the management of avoiding singularities. One exemplary embodiment of a method and a device for controlling the attitude of a satellite with the aid of a control moment gyro cluster is described in document FR 2 786 283 or in document FR 2 826 470.

In order to be able to create torques in all directions, a cluster of four control moment gyros is most frequently placed, according to the prior art, so that the gimbal axes of the four control moment gyros are perpendicular respectively to the four faces of a pyramid which is most frequently regular (a configuration called "pyramidal"). Other configurations exist for which the arrangement of the control moment gyros is different from the latter, but in any case it is necessary, to be able to effectively create torques in all directions, that the control moment gyros, being at least three in number, do not have all their gimbal axes aligned in a single direction. At least two different inclinations are necessary for all of the gimbal axes of the cluster.

The problem then arises of installing this control moment gyro cluster in the satellite. As an illustration, it is possible to consider that this involves placing a four-control moment gyro cluster on a mounting plane consisting of the carrying structure of the satellite, for example one of the walls of the satellite, so as to comply with the desired geometry of the cluster, for example, by seeing to it that the gimbal axes of the control moment gyros are perpendicular respectively to the four faces of a regular pyramid with an apex angle specified by the user.

According to the prior art, which is found for example in the publication "Practical Results on the development of a Control Moment Gyro based Attitude Control System for Agile Small Satellites", V. J. Lappas, W. H. Steyn, C. I. Underwood, issued during "The Sixteenth Annual AIAA/USU Conference on Small Satellites, Aug. 12-15, 2002, Logan, Utah, USA", each control moment gyro is attached according to the illustrative diagram of FIG. 1a to an intermediate structure 1 itself attached to said mounting plane 2, so that the gimbal axis 3 is inclined relative to the mounting plane 2, the rotor 4a, 4b of the gimbal is in two separate portions and accommodates the wheel 6 on either side at two opposite points, the two portions of the stator 5a, 5b of the gimbal are attached to the intermediate structure 1 on either side of the wheel 6, or are incorporated into said intermediate structure 1, and the intermediate structure has a recess 7 which allows the wheel to rotate 360° on its support. The geometry of the intermediate structure, which will be called schematically a cradle structure, is such that the gimbal axis of the control moment gyro is inclined relative to the mounting plane, at a desired angle.

Based on this configuration, there are variants according to the prior art, according to which either the intermediate structures of the control moment gyros are mounted independently on the mounting plane, or, on the contrary, they form a single structure of the pyramidal type for example to which all the control moment gyros of the cluster are attached according to the principle specified above. This alternative is shown schematically in section in FIG. 1b.

These installations according to the prior art have certain limitations. First of all, the bulk and weight of the mounting device are considerable, because the gimbal accommodates the wheel on both sides, which increases the size and the weight of the intermediate structure for a dimension and a given wheel weight. This intermediate structure is all the more complex because it has to be hollowed out to allow the wheel to pass when the latter rotates 360°. It must therefore have a "cradle" shape which surrounds the wheel and accommodates the gimbal axes on either side of the wheel, while attaching the whole of the control moment gyro to the mounting plane while inclining the gimbal axis of the control moment gyro at the desired angle. The weight and complexity of this intermediate structure will be so much greater as the whole device must be designed to withstand very unfavorable dynamic environments without deformation or damage, notably during the satellite launch phase during which the whole device sustains static accelerations of up to several g, vibrations typically of 20-100 g in the range 10-100 Hz and impacts of typically 1000 g in the range 100-1000 Hz (impacts).

In this device according to the prior art, one way of limiting the weight and bulk of the control moment gyro-carrying structures is to assemble them in a single structural piece on which the whole of the cluster is mounted. Nevertheless, in this case, another limitation appears which is the lack of modularity of the device, the latter having to be mounted en bloc on the satellite carrying structure, with no possibility of individually installing each of the control moment gyros in different locations on the satellite. It can be understood how difficult it is to arrange this fixedly-attached assembly of control moment gyros on board a satellite whose general shape is usually parallelepipedal, each wall of the satellite being cluttered with equipment (electronic, propulsion, payload elements, etc.).

SUMMARY OF THE DISCLOSURE

Therefore, the object of the device for mounting control moment gyros according to the invention is to make possible the modular production of control moment gyro clusters that are small in size, compact and have a minimum space requirement relative to the angular momentums and torques delivered.

The invention applies more particularly to controlling the attitude of small satellites, typically weighing between 100 and 500 kg, for which it is important to minimize the bulk and weight of the assembly consisting of the mechanical portion of the control moment gyro, of the interface part of this mechanical portion with the carrying structure of the satellite, of the control electronics, and of the insulation and attenuation devices which may be necessary to reduce the vibrations induced by the control moment gyro on the carrying structure. Nevertheless, the invention is also advantageous for control moment gyros of larger dimension designed to be incorporated into satellites, and more generally spacecraft such as space stations, or any other large space system the weight of which may amount to several tons.

One of the objects of the invention is also to allow the production of a control moment gyro making it possible to prevent the propagation of the microvibrations transmitted by the inertia wheel to the satellite.

In order to reduce the weight and bulk of a control moment gyro and of its device for mounting onto a satellite carrying structure, the subject of the present invention is a control moment gyro comprising an inertia wheel mounted, by means of a wheel support, on the movable portion or rotor of a gimbal assembly also comprising a stator and means for rotating the rotor relative to the stator about a first axis of rotation, the spinner of said inertia wheel being able to be rotated about a second axis of rotation not aligned with said first axis of rotation, characterized in that the stator of the gimbal is mounted on a chock and attached to the chock by vibration-attenuation means, and in that the means for rotating the rotor are at least partially housed in the internal volume of the chock.

A control moment gyro and its mounting device are then obtained having less volume and weight than in the prior art and making it possible to attenuate the microvibrations transmitted by the inertia wheel to the satellite.

Advantageously, the first axis of rotation is inclined relative to the lower base of the chock.

Advantageously, the stator of the gimbal is mounted on a chock the lower base of which is planar, the chock having an upper face that is inclined relative to the planar base.

According to a variant of the invention, the stator of the gimbal is screwed onto the chock by vibration-attenuation means.

Advantageously, the angle of inclination between the axis of rotation of the rotor relative to the stator of the gimbal and the normal to the planar base is less than 60°, and preferably is substantially equal to 30°.

In order to minimize the volume and weight induced by the wiring, the electronic means for controlling the control moment gyro are housed in the internal volume of the chock.

Again in order to improve the compactness of the control moment gyro, the chock has an orifice in which the means of rotating the rotor relative to the stator of the gimbal are capable of being engaged.

According to an advantageous embodiment, the orifice is provided in the upper face of the chock.

In order to minimize the microvibrations transmitted by the inertia wheel to the satellite, the stator of the gimbal is attached to the upper face of the chock by the vibration-attenuation means.

Again in order to improve the effect of microvibration attenuation, the vibration-attenuation means are distributed over the periphery of the stator of the gimbal.

According to an advantageous embodiment, the vibration-attenuation means comprise at least one part attached to the chock and at least one other part attached to the stator of the gimbal.

In order to effectively attenuate the vibrations, at least one part attached to said chock is connected to at least one other part attached to said stator of the gimbal by at least one elastomer mounting block.

In order to effectively attenuate the vibrations, the points for attaching the stator of the gimbal to the vibration-attenuation means are situated approximately in one and the same plane, and the center of gravity of the assembly consisting of the wheel, the wheel support, the stator of the gimbal and the rotation means is separated from said plane by at most a few centimeters.

In order to allow the control moment gyro to be directly attached to the structure of the satellite, the planar base has means for attachment preferably to a platform of a satellite or of a spacecraft.

A further subject of the invention is a spacecraft, characterized in that at least one control moment gyro according to the invention is used for controlling its attitude.

Advantageously, at least two control moment gyros according to the invention are used for controlling its attitude, and the chocks of at least two control moment gyros are attached to one another by appropriate attachment means, or are combined in a single structure.

BRIEF DESCRIPTION OF THE DRAWINGS

The present invention is now described with the aid of an example that is solely illustrative and in no way limiting of the scope of the present invention and which is based on the following illustrations, in which.

DETAILED DESCRIPTION OF THE DISCLOSURE

Figure 1A:
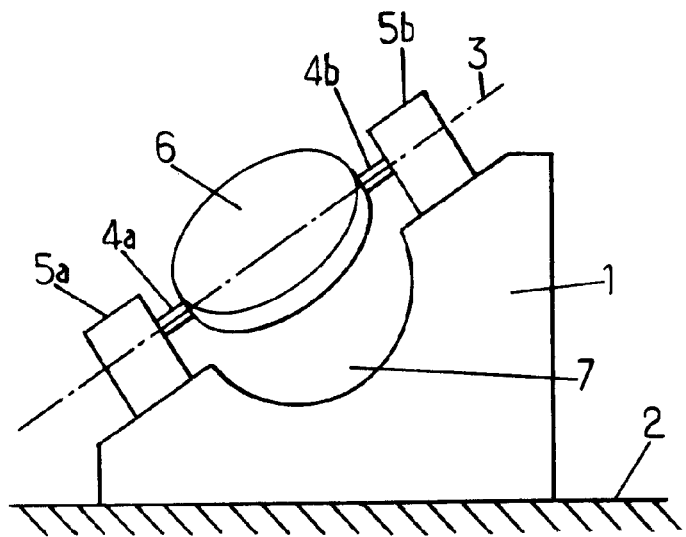
FIG. 1a, already mentioned, is a view in section through the axis of the gimbal of a control moment gyro and of its mounting device of known type.
Figure 1B:
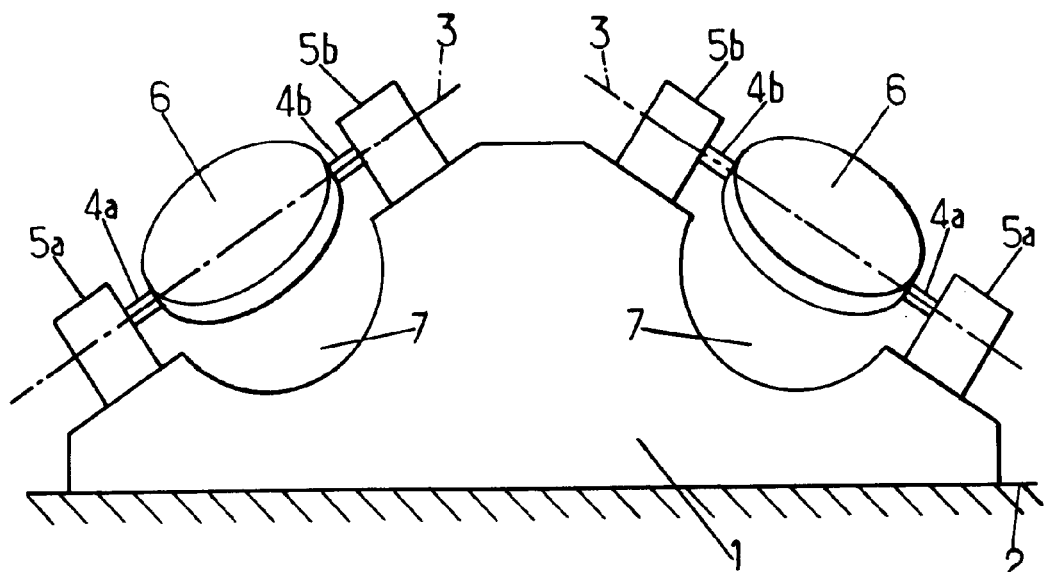
FIG. 1b, already mentioned, is a view in section of a control moment gyro cluster and of its mounting device of known type.
Figure 2:
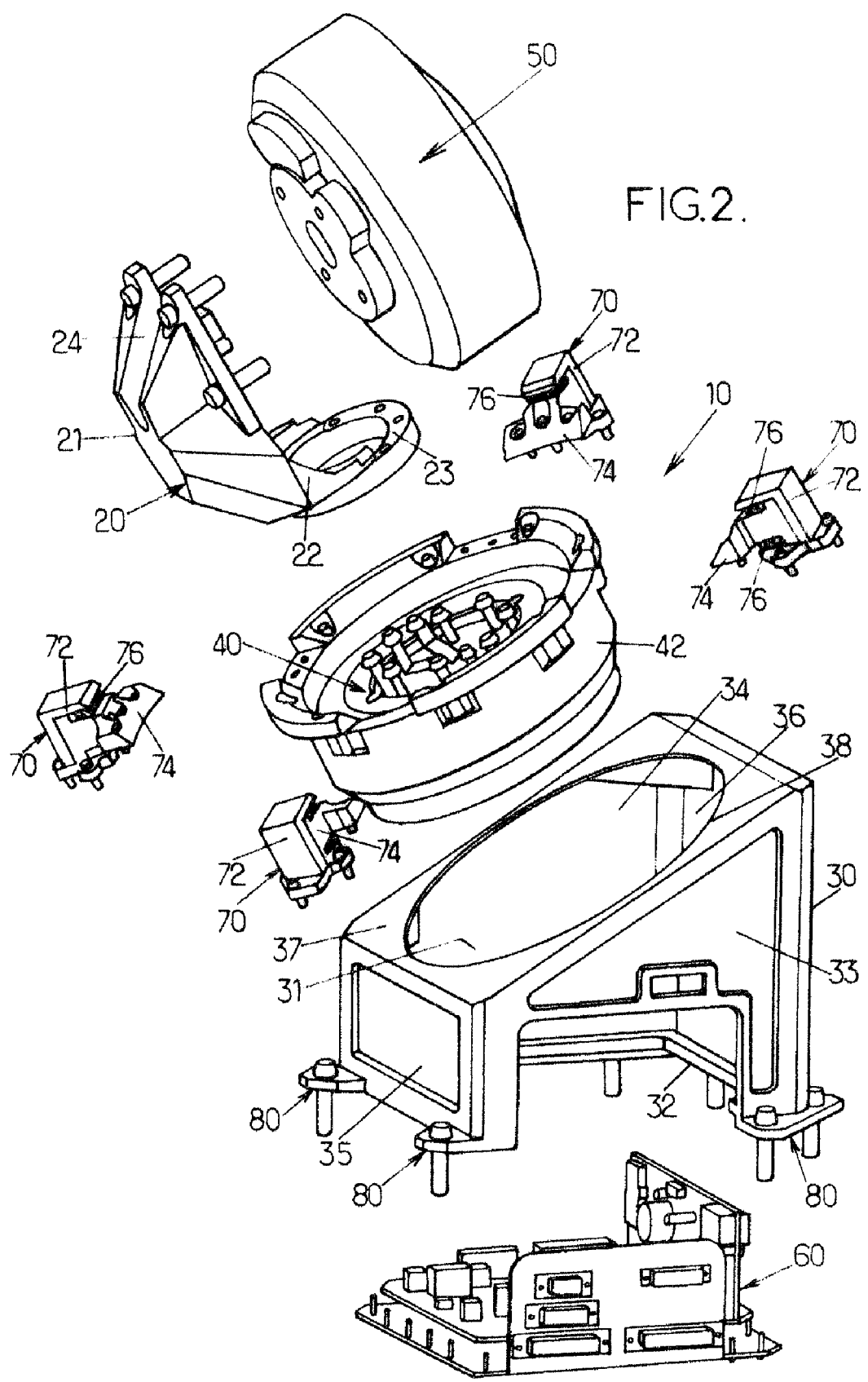
FIG. 2 represents an exploded view in perspective of a control moment gyro according to the invention.

Depicted in an exploded view in FIG. 2 is a control moment gyro 10 comprising an inertia wheel 50 mounted, by means of a wheel support 20, on the movable portion 40 of an assembly comprising a rotor (that is to say said movable portion 40), a stator 42 and means for rotating the rotor relative to the stator about a first axis of rotation, the spinner of said inertia wheel 50 being able to be rotated about a second axis of rotation not aligned with said first axis of rotation, characterized in that said stator 42 is mounted on a chock 30 of which the lower base 32 is planar, said first axis of rotation is inclined relative to said lower base 32, and said means for rotating said rotor 40 are at least partially housed in the internal volume 31 of said chock 30.

The inertia wheel 50 may have a make-up of known type. For example, it comprises a sealed casing and a spinner. The casing is furnished with a support plate which supports the bearings on which the spinner turns, the stator of the motor for driving the spinner and a tachometer. The internal make-up of the wheel will not be described in detail because it may be of a known type.

In general, the spinner is rotated at a high, usually constant speed. The drive motor comprises, for example, a brushless and ironless torque motor, usually electronically switched, the torque of which compensates for the energy dissipations through friction.

Furthermore, according to the invention, the gimbal consists of a movable portion, the rotor 40, of a fixed portion, the stator 42, and of means for rotating the rotor 40 relative to the stator 42, means that are not shown in the figure.

Said means for rotating the rotor relative to the stator of the gimbal usually include a motor, advantageously of the brushless torque motor type, and an angle coder 86 (see FIG. 3) and for example a brushed power collector making it possible to transfer the electric power that is to supply the wheel through the gimbal.

A chock 30 is made so that it defines an internal volume 31 in which the means for rotating the rotor 40 of the gimbal are at least partly housed. Sometimes, but not necessarily, the stator 42 of the gimbal is also at least partially housed in the internal volume 31 of the chock 30.

According to a preferred embodiment of the chock 30, the latter comprises:

- a lower planar base 32, partially hollowed out, in which the electronic portion 60 for controlling the motors of the gimbal and of the wheel 50 as well as all of the means for interfacing between the control moment gyro 10 and the satellite or spacecraft are capable of being engaged and inserted, the lower base 32 defining a horizontal plane with attachment means 80 for attaching the control moment gyro 10 to the platform or the body of the spacecraft or of the satellite;
- four lateral walls 33-36, namely two trapezoidal walls 33, 34 parallel with one another and two rectangular walls 35, 36 parallel with one another, one of the two rectangular walls 36 being higher than the other rectangular wall 35;
- an upper face 37 connecting the upper edges of the four lateral walls 33-36, the upper face 37, opposite to the lower planar base 32, having an angle of inclination relative to the planar base 32, the upper face 37 having a central orifice 38 in which the means for rotating the rotor 40 of the gimbal is capable of being engaged, inserted and fixed.

Provision is also made to incorporate into the internal volume 31 of the chock 30 the control means for interfacing between the satellite or the spacecraft and the control moment gyro 10 and the electronic means 60 making it possible to control the means for rotating the rotor 40 of the gimbal.

The structure 20 for supporting the wheel 50 is more precisely in the form of an end-plate 21, the terminal portion 22 of which is attached to the rotor 40 and the narrower portion 24 of which supports the nonrotating portion of the wheel 50.

The terminal portion 22 of the structure 20 for supporting the wheel 50 comprises a ring 23 capable of being rotated by the means for rotating the rotor 40.

In order to reduce the microvibrations which are generated by the rotation of the inertial weight of the wheel 50 and which are transmitted to the satellite equipment the performance of which may thereby be reduced, provision is made to place vibration attenuators or insulators 70 in the form of modular multi-axis vibration and impact isolation devices, which are elastomer-based, on the periphery of the stator 42 of the gimbal. Such modular isolation devices, notably described in patent application FR 05 13083, are capable of attenuating the microvibrations transmitted by the control moment gyro 10 to the carrying structure during operation in orbit, and conversely the vibrations and impacts transmitted by the carrying structure to the control moment gyro, in particular during the launch of the satellite.

However, according to a particular embodiment, these multi-axis devices 70 for isolating at least one vibration-generating item of equipment (for example an inertia wheel 50) are characterized in that they comprise a plurality of isolation modules each comprising two rigid parts, one of which, called the outer part 72, is designed to be attached to the carrying structure, namely the chock 30, and the other, called the inner part 74, is designed to be attached to the vibrating equipment or to a support of the latter, namely the stator 42 of the gimbal. The inner and outer parts 72, 74 are connected to one another by damping means, for example by at least one isolation mounting block 76, preferably made of elastomer, attenuating by its deformation on at least one of its axes, the tension, compression or shearing axis, the transmission of low-amplitude vibrations generated by the vibration-generating equipment.

Attachment means, in the form of a plurality of orifices 75, are also provided on the upper face 37 of the chock 30 allowing the attachment of the vibration-attenuation and isolation means 70, and more precisely for the attachment of the outer part 72 of the attenuation and isolation means 70 to the chock 30.

Therefore, the means for rotating the rotor 40 of the gimbal, and the stator 42 of the gimbal, are supported in the orifice 38 of the upper face 37 by the attenuation and isolation means 70 capable of attenuating and isolating the vibrations and impacts, notably when the inertia wheel 50 is placed in rotation.

The means 70 for attenuating and isolating the vibrations are preferably distributed over the periphery of the stator 42 of the gimbal, for example in the form of four isolation modules as previously described and distributed over four equidistant points of one and the same circle, preferably at the four corners of the upper face 37.

The degree of inclination of the upper face 37 of the chock 30 relative to the plane of the lower base 32 makes it possible to determine the angle of orientation of the control moment gyro 10. Advantageously, the angle of inclination between the lower planar base 32 and the upper face 37 is between 0 and 60°, and preferably is substantially equal to 30°.

Furthermore, the integrated electronics 60 substantially minimize the volume and the weight induced by the wiring.

The microvibrations are also minimized with the integrated attenuation means 70 which are more effective because of the closeness of the attenuation means 70 and the source of the vibrations generated by the wheel 50 rotating at high speed.

Figure 3:
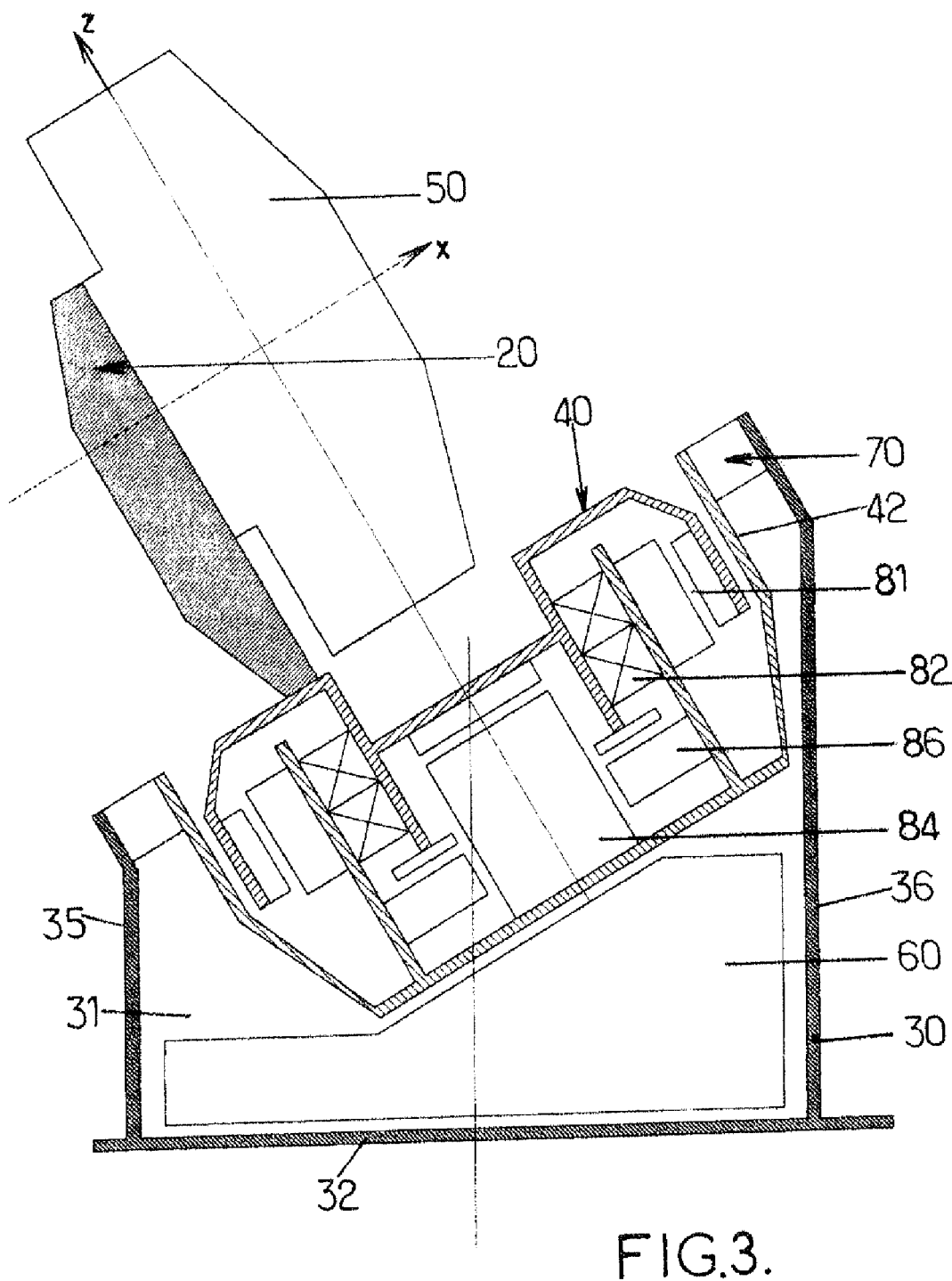
FIG. 3 represents a simplified schematic view in section of the control moment gyro according to the invention.

FIG. 3 represents a view in simplified schematic section of the embodiment of the control moment gyro 10 according to the invention, in which the presence of driving means 81 capable of rotating the rotor 40 of the gimbal can be seen.

Rolling bearings 82 are provided between the stator 42 and the rotor 40 of the gimbal.

A central passageway 84 is provided for the passage of signals and a position sensor 86 capable of measuring the angle of rotation of the movable portion of the gimbal, namely the angle of rotation of the rotor 40 of the gimbal.

Figure 4A:
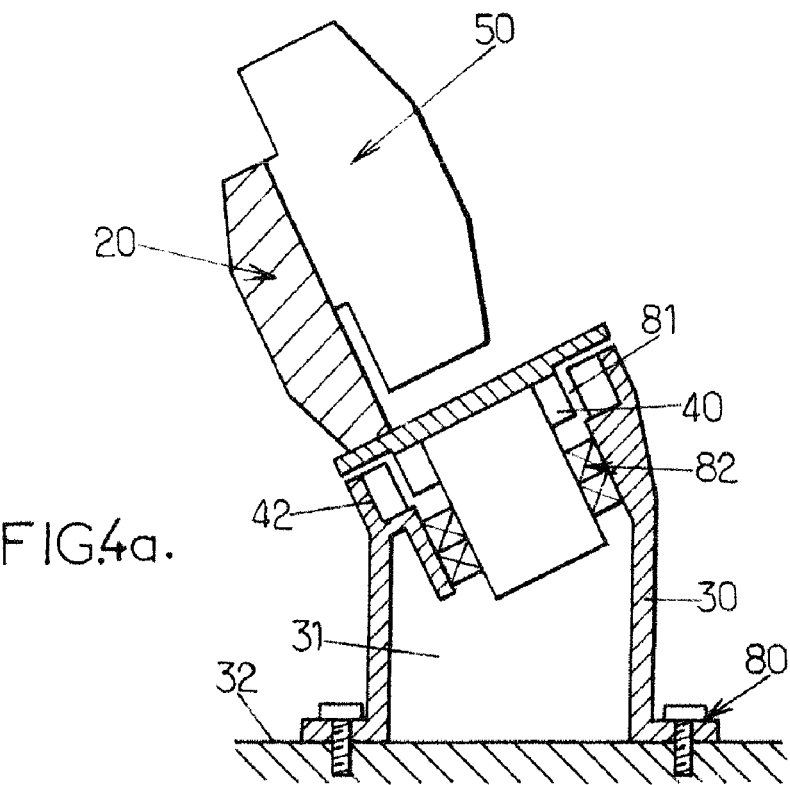
FIGS. 4a and 4b represent different variants of the mounting of the control moment gyro on its support according to the invention.
Figure 4B:
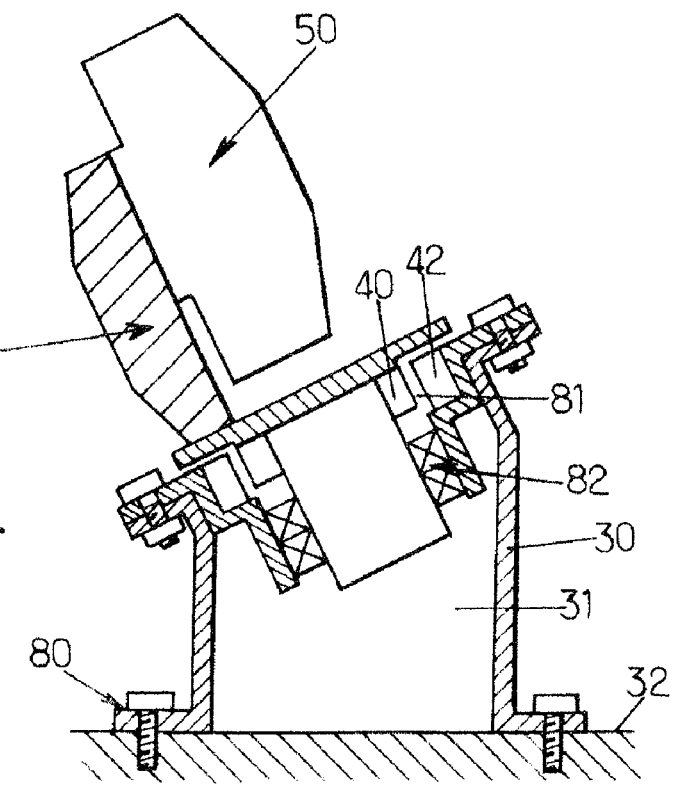

FIG. 4 shows very schematically two other types of mountings of the stator of the gimbal on the chock. In FIG. 4a, the stator 42 and the chock 30 are in one piece. In FIG. 4b, the stator 42 is screwed onto the chock 30.

Figure 5:
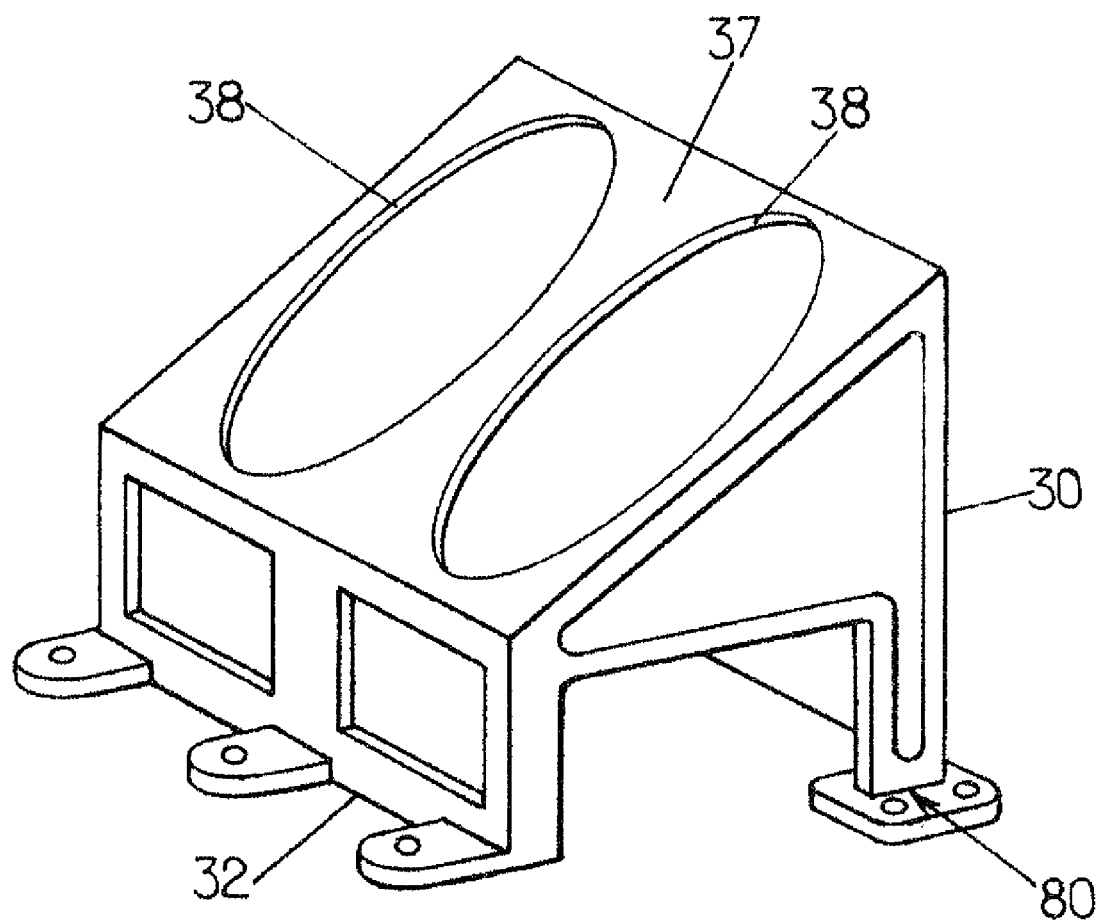
FIG. 5 represents a possible integration of several mounting devices according to the invention.

FIG. 5 shows a device according to the invention in which several chocks 30 are incorporated into one another to form a single structure making it possible to incorporate several control moment gyros of the type of the invention.

In conclusion, in addition to the fact that the invention makes it possible to make a control moment gyro and its attachment device more compact, with reduced volume and making it possible to attenuate the propagation of the microvibrations of the inertia wheel to the satellite, it is also easier to replace the control moment gyros according to the invention independently because each control moment gyro is independent and no longer depends on the wiring provided by the satellite which connects the mechanism and the electronics. In addition, the chock 30 also plays a role of protecting the control electronics 60 against radiation.

The invention claimed is:

1. A control moment gyro comprising:
   a chock having a lower base, an upper face provided with a central orifice, and lateral walls extending from the lower base to the upper face;
   a gimbal assembly comprising a stator;
   an inertia wheel mounted, by means of a wheel support, on a movable portion named rotor of said gimbal assembly that also comprises driving means for rotating said rotor relative to said stator about a first axis of rotation, said inertia wheel having a spinner able to be rotated about a second axis of rotation not aligned with said first axis of rotation;
   at least one vibration-attenuation element distinct from the chock and arranged in contact with said lateral walls and adjacent the upper face;
   wherein said stator of said gimbal assembly is mounted on said chock through the central orifice and attached to said chock by said at least one vibration-attenuation element, and said driving means for rotating said rotor are at least partially housed in an internal volume of said chock.

2. The control moment gyro as claimed in claim 1, wherein said first axis of rotation is inclined relative to said lower base of said chock.

3. The control moment gyro as claimed in claim 1, wherein said lower base of the chock is planar, said chock having an upper face inclined relative to said planar base.

4. The control moment gyro as claimed in claim 3, wherein said stator of said gimbal assembly is screwed onto said chock by said at least one vibration-attenuation element.

5. The control moment gyro as claimed in claim 3, wherein the angle of inclination between said first axis of rotation and the normal to said planar lower base is less than 60.

6. The control moment gyro as claimed in claim 3, in which said driving means for rotating said rotor relative to said stator of said gimbal assembly are engageable through the central orifice.

7. The control moment gyro as claimed in claim 3, wherein said stator of said gimbal assembly is attached to said upper face of said chock by said at least one vibration-attenuation element.

8. The control moment gyro as claimed in claim 3, wherein said planar base has means for attachment to a platform of a satellite or a spacecraft.

9. The control moment gyro as claimed in claim 1, wherein electronic means for controlling said control moment gyro are housed in said internal volume of said chock.

10. The control moment gyro as claimed in claim 1, wherein said at least one vibration-attenuation element comprises at least two vibration-attenuation elements distributed over the periphery of said stator of said gimbal assembly and spaced from each other.

11. The control moment gyro as claimed in claim 1, wherein said at least one vibration-attenuation element comprises a plurality of vibration-attenuation units each provided with one part attached to said chock and one other part attached to said stator of said gimbal assembly.

12. The control moment gyro as claimed in claim 11, wherein, in each of the plurality of vibration-attenuation units, said part attached to said chock is connected to said part attached to said stator of said gimbal assembly by at least one elastomer mounting block.

13. The control moment gyro as claimed in claim 1, wherein the points for attaching said stator of said gimbal assembly to said at least one vibration-attenuation element are situated substantially in one and the same plane, and the center of gravity of an assembly consisting of said wheel, the wheel support, said stator and said driving means for rotating said rotor is separated from said plane by at most a few centimeters.

14. The control moment gyro as claimed in claim 1, wherein the wheel support comprises a lower part extending perpendicular to the first axis of rotation, and in which the stator surrounds said lower part of the wheel support.

15. The control moment gyro as claimed in claim 1, wherein said driving means for rotating the rotor are located closer to the first axis than said at least one vibration-attenuation element.

16. A spacecraft wherein at least one control moment gyro is used for controlling the spacecraft attitude, said control moment gyro comprising:
- a chock having a lower base, an upper face provided with a central orifice, and lateral walls extending from the lower base to the upper face;
- a gimbal assembly comprising a stator;
- an inertia wheel mounted, by means of a wheel support, on a movable portion named rotor of said gimbal assembly that also comprises driving means for rotating said rotor relative to said stator about a first axis of rotation, said inertia wheel having a spinner able to be rotated about a second axis of rotation not aligned with said first axis of rotation;
- at least one vibration-attenuation element distinct from the chock and arranged in contact with said lateral walls and adjacent the upper face;
- wherein said stator of said gimbal assembly is mounted on said chock through the central orifice and attached to said chock by said at least one vibration-attenuation element, and said driving means for rotating said rotor are at least partially housed in an internal volume of said chock.

17. The spacecraft as claimed in claim 16, wherein at least two said control moment gyros are used for controlling the spacecraft attitude, and chocks of at least two control moment gyros are attached to one another by attachment means or are combined in a single structure.

18. A control moment gyro comprising:
- a chock defining an internal volume;
- a gimbal assembly comprising a stator;
- an inertia wheel mounted, by means of a wheel support, on a movable portion named rotor of a gimbal assembly that also comprises driving means for rotating said rotor relative to said stator about a first axis of rotation, said inertia wheel having a spinner rotatable about a second axis of rotation not aligned with said first axis of rotation;
- at least one vibration-attenuation element, which is distinct from the chock;
- wherein said stator of said gimbal assembly is mounted on said chock and attached to said chock by said at least one vibration-attenuation element; and
- wherein said driving means for rotating said rotor are at least partially housed in the internal volume of said chock, said driving means for rotating the rotor being located closer to the first axis than said at least one vibration-attenuation element.

\* \* \* \* \*